(12) United States Patent
Lee

(10) Patent No.: US 9,791,199 B2
(45) Date of Patent: Oct. 17, 2017

(54) ICE MAKER FOR REFRIGERATOR AND MANUFACTURING METHOD FOR THE SAME

(71) Applicant: Dongbu Daewoo Electronics Corporation, Seoul (KR)

(72) Inventor: Wang Goo Lee, Seoul (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 105 days.

(21) Appl. No.: 14/823,988

(22) Filed: Aug. 11, 2015

(65) Prior Publication Data

US 2016/0370077 A1    Dec. 22, 2016

(30) Foreign Application Priority Data

Jun. 16, 2015  (KR) .................. 10-2015-0085334

(51) Int. Cl.
*F25C 5/18*    (2006.01)
*B23P 15/26*    (2006.01)

(52) U.S. Cl.
CPC .............. *F25C 5/182* (2013.01); *B23P 15/26* (2013.01)

(58) Field of Classification Search
CPC .. F25C 5/182; F25C 5/007; F25C 1/00; B23P 15/26; F25D 17/062
USPC .................................................. 62/344, 353
See application file for complete search history.

(56) References Cited

U.S. PATENT DOCUMENTS

| | | | |
|---|---|---|---|
| 3,561,231 | A | 2/1971 | Webb |
| 4,789,130 | A | 12/1988 | Stich et al. |
| 7,152,424 | B2 | 12/2006 | Shoukyuu et al. |
| 2008/0034780 | A1* | 2/2008 | Lim .................. F25C 1/04 62/353 |
| 2013/0263621 | A1* | 10/2013 | An .................. F25C 5/185 62/344 |

FOREIGN PATENT DOCUMENTS

| | | |
|---|---|---|
| EP | 2154454 A2 | 2/2010 |
| JP | 2000-009372 A | 1/2000 |
| JP | 2001-174143 A | 6/2001 |
| JP | 2002-090015 A | 3/2002 |
| JP | 2004-239460 A | 8/2004 |
| JP | 4407439 | 11/2009 |
| KR | 10-2013-0114848 A | 10/2013 |
| KR | 10-2013-0130316 | 12/2013 |

OTHER PUBLICATIONS

Extended European Search Report dated Nov. 17, 2016 issued in corresponding European Patent Application No. 15185833.9.

* cited by examiner

*Primary Examiner* — Len Tran
*Assistant Examiner* — Ana Vazquez

(57) ABSTRACT

An ice maker for refrigerator includes a case that encloses and protects a cooling space into which cold air is supplied, an ice making assembly for making ice using cold air supplied to the cooling space, an ice bucket for containing the ice made by the ice making assembly in the cooling space, and a cold air ventilation path for guiding cold air to flow along the outer circumferential surface of the ice bucket in the cooling space.

6 Claims, 5 Drawing Sheets

ICE MAKER FOR REFRIGERATOR AND MANUFACTURING METHOD FOR THE SAME

CROSS-REFERENCE TO RELATED APPLICATION

This application is based on and claims priority to Korean Patent Application No. 2015-0085334, filed on Jun. 16, 2015, the disclosure of which is incorporated herein in its entirety by reference.

TECHNICAL FIELD

Embodiments according to the present invention relate to an ice maker for a refrigerator and a method for manufacturing thereof, and more particularly, to an ice maker having an ice bucket that can contain ice made by an ice making assembly and a method for manufacturing thereof.

BACKGROUND

A refrigerator is an apparatus for keeping food refrigerated.

The inside of a refrigerator is cooled by cold air that is continually being supplied. The cold air is continually generated by heat exchanging action of a refrigerant during a refrigerating cycle such as a compression-condensation-expansion-evaporation cycle. Cold air supplied into the refrigerator is evenly transferred by convection so that food and drink in the refrigerator can be stored at a desired temperature.

In general, the body of refrigerator has a cuboidal shape of which the front is open. A refrigerator compartment and a freezer compartment may be provided in the body. Further, the front of the body can be equipped with a door for the refrigerator compartment and a door for the freezer compartment to cover the openings. The storage space inside the refrigerator can include a number of drawers and racks, storage boxes, and so on to keep various foods and drinks in optimal condition inside the refrigerator.

A top freezer type of refrigerator includes a freezer compartment positioned at the top and a refrigerator compartment positioned at the bottom. In recent times, a bottom freezer type of refrigerator that includes a freezer compartment positioned at the bottom has been introduced. In the case of a bottom freezer type of refrigerator, since the refrigerator compartment, which is used often, is positioned at the top, and the freezer compartment, which is used less often, is positioned at the bottom, there is an advantage because a user may conveniently use the refrigerator compartment. However, since the freezer compartment of a bottom freezer type of refrigerator is positioned at the bottom, the user has to bend his/her body and open the door of the freezer compartment to take out ice, and this may not be comfortable to the user.

To solve this problem, in recent times, a refrigerator that has an ice dispenser in the door of the refrigerator compartment positioned at the top of a bottom freezer type of refrigerator has been introduced. In this case, an ice maker may be equipped in the door of the refrigerator compartment or inside the refrigerator compartment.

The ice maker may include an ice making assembly having an ice tray for making ice, an ice bucket for storing the ice, and a transfer assembly for transferring the ice stored in the bucket to the dispenser. The ice made in the ice making assembly is dropped to the ice bucket positioned at the bottom of the ice tray and then may pile up in the ice bucket.

Furthermore, cold air used to make ice in a cooling space of the ice maker is supplied through a discharge duct by an air blower. Ice-making speed is enhanced if cold air is smoothly ventilated in the cooling space.

However, according to the prior art, the ice bucket has the shape of a simple box. If an ice bucket having that shape is covered by the case of the ice maker, the flow of cold air may be obstructed so that the ice maker is not able to obtain a satisfactory ice-making speed.

Further, in an environment where the internal temperature of the cooling space may increase due to frequent opening and closing of the door of the refrigerator compartment or because hot and humid outside air enters the refrigerator, if cold air is not smoothly ventilated, then ice may clump together (e.g., individual ice cubes may stick to each other).

SUMMARY

In view of the above, the present invention provides an ice maker in which a flow of cold air is not obstructed by an ice bucket used for containing ice made by an ice making assembly, and a method for manufacturing thereof.

The technical scope of the present invention is not limited to the aforementioned technical scope, and other technical scopes not mentioned above will be apparent to those skilled in the art from the following description.

In accordance with an embodiment of the present invention, there is provided an ice maker for a refrigerator. In an embodiment, the ice maker includes a case for enclosing and protecting a cooling space into which cold air is supplied, an ice making assembly for making ice by using cold air in the cooling space, an ice bucket for accumulating the ice made by the ice making assembly in the cooling space, and an cold air ventilation path for guiding cold air to flow along the outer circumferential surface of the ice bucket in the cooling space.

The cold air ventilation path may form a furrow that guides a flow of cold air between contiguous ribs formed on the outer circumferential surface of the ice bucket.

The ribs may be formed in the direction that the ice bucket is pushed into the case or pulled out from the case.

At least any one of the ribs includes a groove for coupling with the case. The groove is formed on a surface facing the ice making assembly.

In accordance with another embodiment of the present invention, there is provided a method for manufacturing an ice maker for a refrigerator. In an embodiment, the method includes forming a case for enclosing and protecting a cooling space into which cold air is supplied, forming an ice making assembly for making ice using cold air in the cooling space, forming an ice bucket including a cold air ventilation path for guiding cold air to flow along the outer circumferential surface of the ice bucket, and assembling the ice bucket to be placed at the bottom of the cooling space for accumulating the ice made by the ice making assembly placed at the top of the cooling space.

The cold air ventilation path may be manufactured to form a furrow that guides a flow of cold air between contiguous ribs formed on the outer circumferential surface of the ice bucket.

The ribs may be manufactured so that they are parallel to the direction in which the ice bucket is pushed into the case or pulled out from the case.

At least any one of the ribs is manufactured to have a groove for coupling with the case. The groove is formed on a surface facing the ice making assembly.

According to embodiments of the present invention, since cold air is guided to flow along the outer circumferential surface of an ice bucket in a cooling space where ice is being made, the flow of cold air is not obstructed by the ice bucket. Accordingly, the ice making speed is enhanced.

Further, in an environment where an internal temperature of the cooling space may be rapidly increased due to frequent opening and closing of the door of the refrigerator compartment or where hot and humid outside air continuously moves into the refrigerator, it is possible to prevent ice from clumping, by smoothly ventilating cold air.

DETAILED DESCRIPTION

Hereinafter, the embodiments of the present disclosure will be described in detail with reference to the accompanying drawings. In the following description, well-known functions or constitutions will not be described in detail if they would unnecessarily obscure the features of the present invention.

Figure 1:
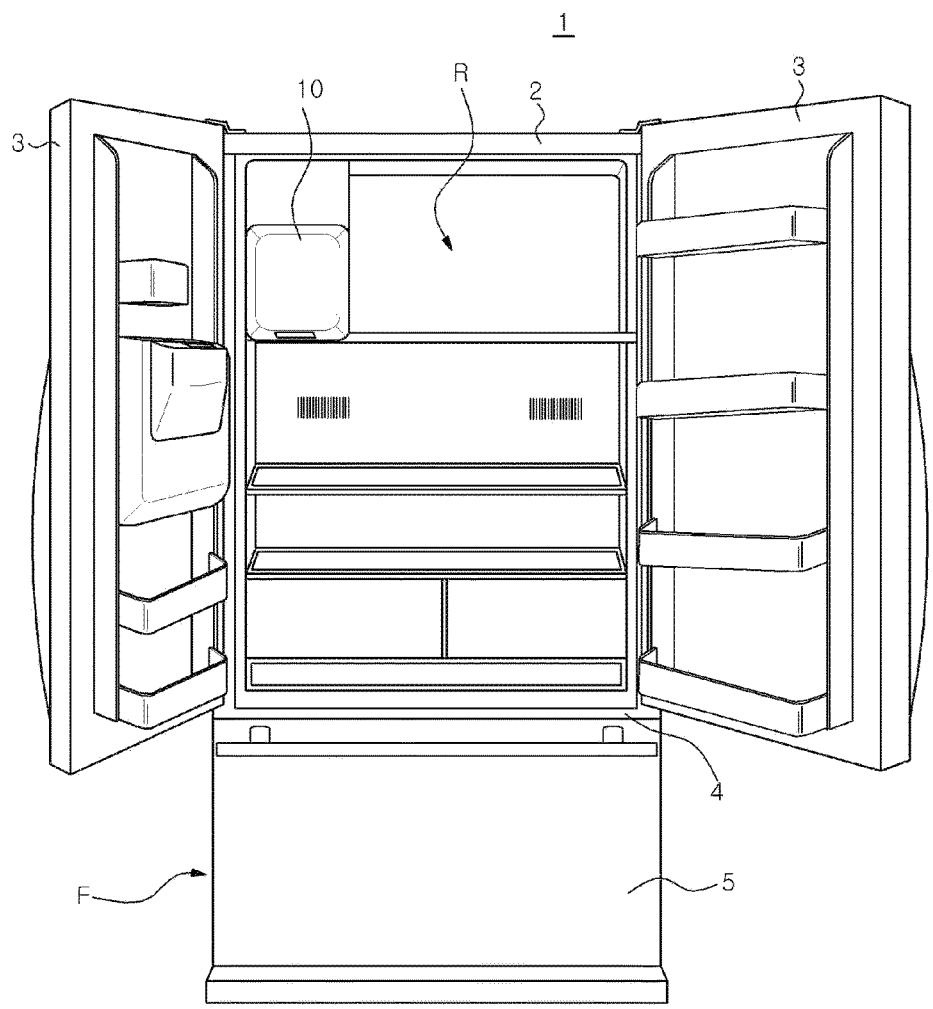
FIG. 1 is a diagram illustrating a refrigerator including an ice maker in accordance with an embodiment of the present invention.
Figure 2:
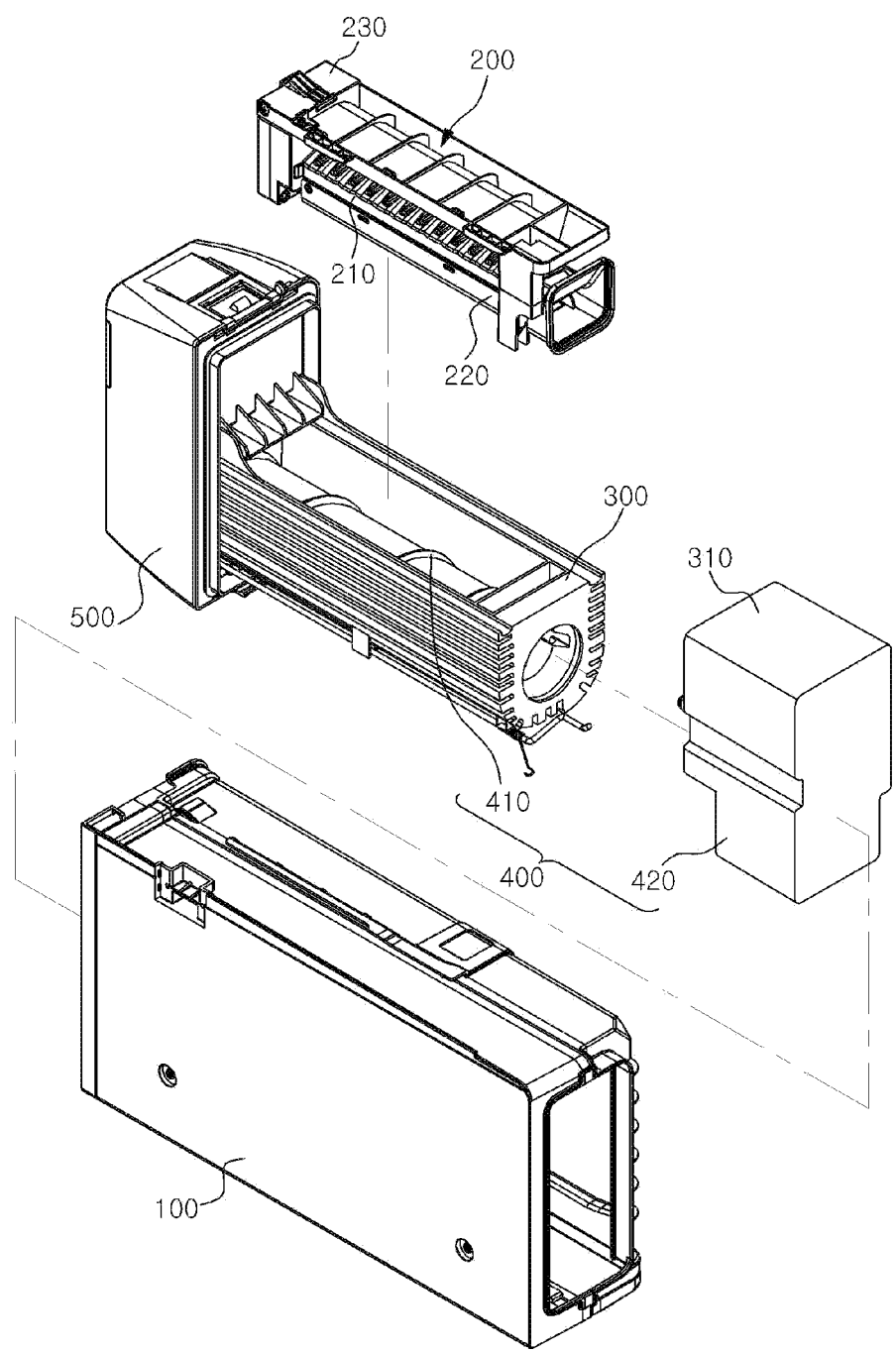
FIG. 2 is an exploded perspective view in accordance with an embodiment of the present invention.
Figure 3:
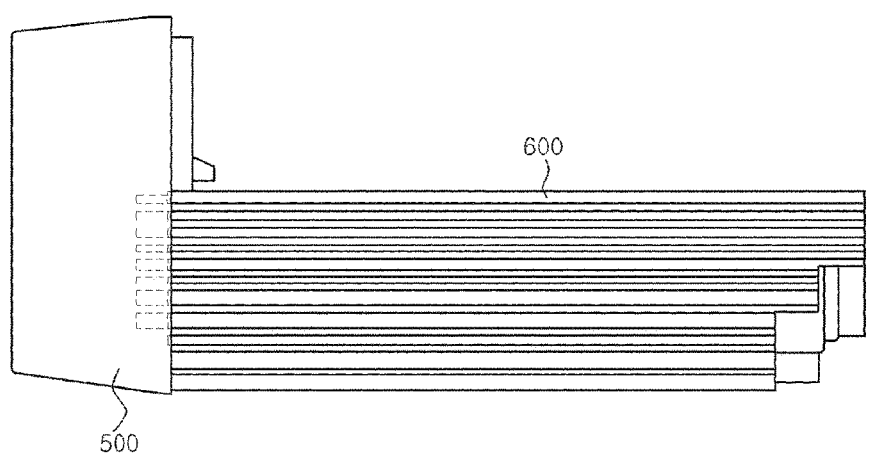
FIG. 3 is a side view of an ice bucket having a cold air ventilation path in accordance with an embodiment of the present invention.
Figure 4:
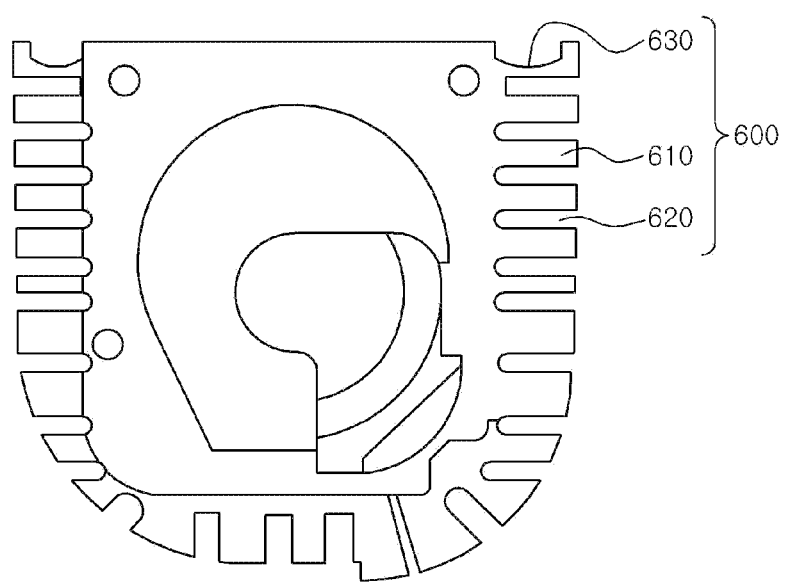
FIG. 4 is a front view of an ice bucket having a cold air ventilation path in accordance with an embodiment of the present invention.

FIG. 1 is a diagram illustrating a refrigerator including an ice maker in accordance with an embodiment of the present invention, FIG. 2 is an exploded perspective view in accordance with an embodiment of the present invention, FIG. 3 is a side view of an ice bucket having a cold air ventilation path in accordance with an embodiment of the present invention, and FIG. 4 is a front view of an ice bucket having a cold air ventilation path in accordance with an embodiment of the present invention.

In accordance with an embodiment of the present invention, an ice maker 10 for a refrigerator may include a case 100, an ice making assembly 200, an ice bucket 300, a transfer assembly 400, a discharge assembly 500, and a cold air ventilation path 600. The ice maker 10 may be placed or installed at one side of the top of a refrigerator compartment (R) forming a refrigerator 1.

As shown in FIG. 1, the refrigerator 1 capable of including the ice maker 10 may include a body 2 forming its exterior, a barrier 4 dividing a space formed in the inside of the body 2 for storing food and drink in the refrigerator compartment (R) at the top and a freezer compartment (F) at the bottom, a refrigerator compartment door 3 on both sides of a front face of the body and for selectively opening and closing the refrigerator compartment (R) through a rotary motion, and a freezer compartment door 5 for covering a front opening of the freezer compartment (F).

In the present embodiment, although the ice maker 10 is illustrated as being provided at one side of the top of the refrigerator compartment (R), it is just an example, and the ice maker 10 may be installed in a different position inside the refrigerator compartment (R) or at a different position such as in the refrigerator compartment door 3.

The case 100 forms a cooling space enabling ice to be made, the ice making assembly 200 may be placed at the top, inside of the cooling space, and the ice bucket 300 may be placed at the bottom of the ice making assembly 200.

The ice making assembly 200 includes an ice tray 210 for containing water, a cold air guiding unit 220 for guiding a flow of cold air to move cold air supplied from a cooling unit along the bottom surface of the ice tray, and a rotating unit for dropping ice made in the ice tray 210 by rotating the ice tray 210.

Cold air generated in the cooling unit is supplied to the ice tray 210 in the cooling space (e.g., the case 100) through a discharge duct 310. The cooling unit may include a compressor, a condenser, an expansion valve, and an evaporator, which constitute a cooling cycle, and generates cold air by exchanging heat between a refrigerant and air. Furthermore, cold air may be supplied to the ice tray 210 via the discharge duct 310 and the cold air guiding unit 220 by an air blower.

The ice tray 210 provides a space where water supplied from a water source is turned into ice. A plurality of forming spaces capable of containing water are formed at the upper side of the ice tray 210. The forming spaces may have various shapes according to a desired shape of the ice, and the quantity of water that can be held by each forming space may be variously adjusted.

The ice tray 210 may be made from a metal or metals having high heat conductivity; as an example, it may be made from aluminum. The higher the heat conductivity of the ice tray 210, the higher the heat exchange rate of water and cold air. Therefore, the ice tray 210 may play the role of a kind of heat exchanger. Further, although it is not shown, a cooling rib and the like may be installed at the bottom surface of the ice tray 210 to increase the amount of surface in contact with cold air.

The cold air guiding unit 220 has a function to guide cold air supplied from the cooling unit to the bottom of the ice tray 210, and may be connected to the discharge duct 310, which is a path through which cold air is being supplied from the cooling unit. Cold air guided by the cold air guiding unit 220 may be moved toward and along the bottom surface of the ice tray 210, and water contained in the ice tray 210 may be turned into ice by exchanging heat between the cold air and the ice tray 210.

Further, after it is made, the ice may be dropped to the ice bucket 300 located at the bottom of the ice tray 210 by the rotating unit 230. As an example, the upper side of the ice tray 210 may be rotated toward the ice bucket 300 at the bottom by the rotating unit 230, and the ice tray 210 is twisted due to interference with an interference member (not shown) when it is rotated more than a specific angle. As a result, the ice contained in the ice tray 210 is dropped to the ice bucket 300 due to the torsion from twisting the ice tray.

The transfer assembly 400 is used to transfer ice to a discharge assembly 500 and may include an auger 410 and an auger motor (not shown), where the auger motor may be included in an auger motor housing 420.

The auger 410 may be a rotating member having a screw or spiral shaped wings, and is rotated by the auger motor. The auger 410 is accommodated inside of the ice bucket 300, and the ice that accumulates in the ice bucket 300 is inserted between blades or wings of the auger 410 and then can be transferred toward the discharge assembly 500 when the auger 410 is rotated.

The discharge assembly 500 has an insulated space that is provided as a path for discharging the ice contained in the ice bucket 300 to the outside, and may be connected with a dispenser (not shown) provided in the refrigerator compartment door 3. According to the selection by a user, the ice transferred by the transfer assembly 400 may be provided to the user through the dispenser.

The discharge assembly 500 may include a cutting device (not shown) capable of cutting the ice, which is transferred from the ice making assembly to an insulated case having an insulated wall that forms an insulated space, into a certain size.

A cold air ventilation path 600 guides cold air to flow along the outer circumferential surface of the ice bucket 300 in the cooling space protected by the case 100.

According to an embodiment of the present invention, the cold air ventilation path 600 may be integrally formed with the ice bucket 300.

For example, a plurality of ribs 610 may be formed on the outer circumferential surface of the ice bucket 300, and the cold air ventilation path 600 may guide a flow of cold air through a furrow 620 that is between a pair of contiguous ribs 610.

Additionally, the ribs 610 may be formed in (parallel to) the direction that the ice bucket 300 is pushed into the case 100 or it is pulled out from the case 100. When the ice bucket 300 is pushed into the case 100 or it is pulled out from the case, it may slide along a path represented by the dashed and dotted line in FIG. 2, and the ribs 610 may be formed on the outer circumferential surface of the ice bucket 300 in the same direction as the sliding direction of the ice bucket 300.

A groove 630 for coupling with the case 100 may be formed on a surface of any one or more of the plurality of ribs 610, facing the ice making assembly 200.

Figure 5:
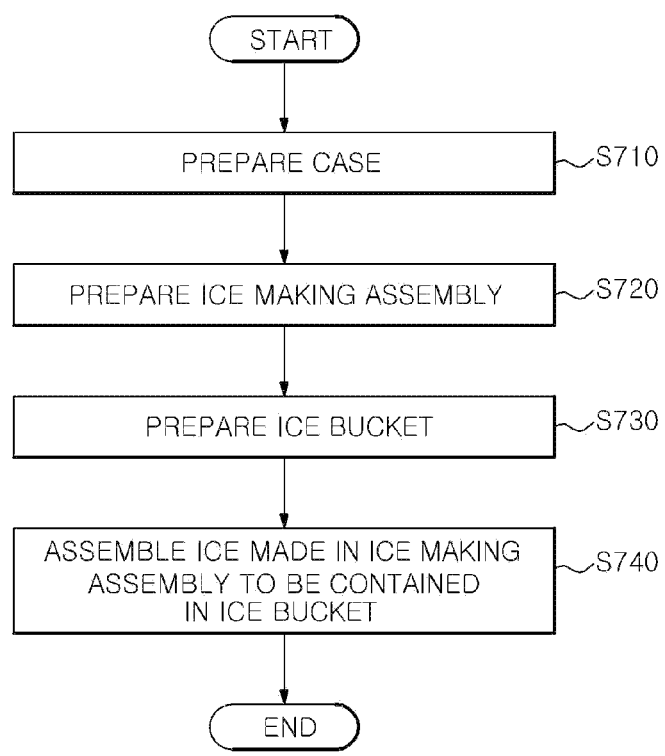
FIG. 5 is a flowchart explaining a method for manufacturing an ice maker in accordance with an embodiment of the present invention.

FIG. 5 is a flowchart of a method for manufacturing an ice maker in accordance with an embodiment of the present invention.

As illustrated above, a method for manufacturing an ice maker will be described in accordance with an embodiment of the present invention.

First of all, the method includes operation S710 for preparing or forming a case for enclosing and protecting a cooling space where cold air is being supplied.

Then, the method further includes operation S720 for preparing or forming an ice making assembly capable of making ice using cold air.

In addition, the method further includes operation S730 for preparing or forming an ice bucket having a cold air ventilation path that guides cold air to flow along the outer circumferential surface of the ice bucket.

The method further includes operation S740 for assembling the ice bucket to be placed at the bottom of the cooling space for containing the ice made by the ice making assembly that is placed at the top of the cooling space.

Hereinafter, as shown in FIG. 1 to FIG. 4, a process or method for manufacturing the ice maker 10 will be described in accordance with an embodiment of the present invention.

First of all, a case 100 for enclosing and protecting a cooling space where cold air is supplied is prepared (formed) (S710).

Then, the ice making assembly 200 for making ice in the cooling space by using cold air is prepared (formed) (S720).

The ice making assembly 200 may include the ice tray 210, the cold air guiding unit 220, and the rotating unit 230.

Additionally, the ice bucket 300 including the cold air ventilation path 600 that guides cold air to flow along the outer circumferential surface of the ice bucket is prepared (formed) (S730). In this operation, the ice bucket 300 and the cold air ventilation path 600 may be designed and manufactured as a separate structure, as shown in FIG. 2 to FIG. 4, or they may be integrally designed and manufactured as a single unit.

In sequence, the ice making assembly 200 is placed at the top of the cooling space, and the ice bucket 300 is placed at the bottom of the cooling space.

Thereafter, the cooling device 100 is assembled to enable the ice bucket 300 to contain the ice made by the ice making assembly 200. In this operation, a groove 630 formed on a surface facing the ice making assembly 200 of any one of the ribs 610 may be used for coupling with the case 100. For example, a protrusion (not shown) may be formed in an inner side of the case 100 for coupling the ice bucket 300 with the cold air ventilation path 600, and a binding force between them may be provided by inserting the protrusion (not shown) of the case 100 into the groove 630.

Accordingly, the function of smoothly ventilating cold air in the cooling space is performed by the cold air guiding unit 220 and the cold air ventilation path 600.

Cold air generated in the cooling unit is supplied to the ice tray 210 in the cooling space (e.g., inside the case 100) through the discharge duct 310, and cold air passed through the bottom surface of the ice tray 210 flows along the outer circumferential surface of the ice bucket 300 through the cold air ventilation path 600. As an example, the furrow 620 formed on the outer circumferential surface of the ice bucket 300 by a plurality of ribs 610 guides the flow of cold air.

Hereinafter, the functionality and operation of the ice maker 10 will be described in accordance with an embodiment of the present invention.

First of all, water supplied from a water source is collected and kept in a tank (not shown), and water collected in the tank may be provided to the ice tray 210 of the ice making assembly 200 or the dispenser (not shown) by selectively opening and closing a valve (not shown).

When water is supplied to the ice tray 210 in the cooling space protected by the case 100, the water is turned into ice. In this case, cold air is generated through a compressor, a condenser, an expansion valve, and an evaporator and passes through the discharge duct 310, and then freezes water contained in the ice tray 210 placed in the cooling space enclosed/protected by the case 100.

In this regard, since the cold air guiding unit 220 is connected to and extends from the discharge duct 310, cold air discharged from the discharge duct 310 is moved along the cold air guiding unit 220.

The cold air exchanges heat with the bottom surface of the ice tray 210, while moving along the bottom surface of the ice tray 210, and water contained in the ice tray 210 is turned into ice.

The cold air is allowed to flow along the outer circumferential surface of the ice bucket 300 by action of the cold air ventilation path 600 integrally formed in the case 100. The cold air flows along the furrow 620 formed by a plurality of ribs 610, forming the cold air ventilation path 600.

As such, since cold air is guided to flow along the outer circumferential surface of the ice bucket 300 in the cooling space where ice is being made, the flow of cold air is not obstructed by the ice bucket 300, and instead is smoothly ventilated.

Accordingly, even in an environment where an internal temperature of the cooling space may be rapidly increased due to frequent opening and closing of the door of the refrigerator compartment or where hot and humid outside air continuously moves into the refrigerator, it is possible to prevent ice from clumping, due to the smoothly ventilating cold air.

The ice made in the ice tray 210 may be dropped by rotating the rotating unit 230 to the bottom and then accumulates in the ice bucket 300 placed in the bottom of the ice tray 210.

The ice accumulated in the ice bucket 300 is inserted between wings (blades) of the auger 410 and then can be transferred toward the discharge assembly 500 when the auger 410 is rotated.

The discharge assembly 500 has an insulated space that provides a path for discharging the ice contained in the ice bucket 300 into the outside, and a cutting device (not shown) that cuts the ice transferred from the ice making assembly 200 into a certain size, and then can provide it to the user through the dispenser equipped in the refrigerator compartment door 3.

As described above, in accordance with an embodiment of the present invention, since cold air is guided to flow along the outer circumferential surface of the ice bucket in the cooling space where the ice is being made, the flow of cold air is not obstructed by the ice bucket. Accordingly, ice making speed in the cooling space is enhanced in comparison with the prior art. Further, the ice in the ice bucket containing the ice is not clumped.

As set forth above, while the present invention has been described in connection with a specific embodiment of the ice maker and method for manufacturing thereof, it is only an example and the present invention is not limited thereto. It should be construed that the present invention has the widest range in compliance with the basic idea disclosed in the disclosure. Although it is possible for those skilled in the art to combine and substitute the disclosed embodiments to embody the other types that are not specifically disclosed in the disclosure, they do not depart from the scope of the present invention as well. In addition, it will be apparent to those skilled in the art that various modifications and changes may be made with respect to the disclosed embodiments based on the disclosure in easy and these changes and modifications also fall within the scope of the present invention.

Accordingly, the scope of the present invention should be interpreted based on the following appended claims, and all technical spirits within an equivalent range thereof should be construed as being included in the scope of the present invention.

What is claimed is:

1. An ice maker for a refrigerator, comprising:
   a case enclosing a cooling space into which cold air is supplied;
   an ice making assembly operable for making ice using the cold air;
   an ice bucket including a plurality of ribs formed on an outer circumferential surface thereof and being configured to be operable for containing the ice made by the ice making assembly in the cooling space; and
   a cold air ventilation path provided between the case and the outer circumferential surface of the ice bucket in the cooling space and being configured to guide the cold air to flow along the outer circumferential surface of the ice bucket,
   wherein the cold air ventilation path is formed as a furrow that guides a flow of the cold air between the contiguous ribs on the outer circumferential surface of the ice bucket, and
   wherein the ribs are formed on the outer circumferential surface to extend in a same direction as a direction in which the ice bucket moves when the ice bucket is pushed into the case and when the ice bucket is pulled out from the case.

2. The ice maker for a refrigerator of claim 1, wherein at least one of the ribs comprises a groove for coupling with the case, the groove being formed on a surface facing the ice making assembly.

3. A method for manufacturing an ice maker for a refrigerator, the method comprising:
   forming a case for protecting a cooling space into which cold air is supplied;
   forming an ice making assembly for making ice using the cold air;
   forming an ice bucket including a plurality of ribs formed on an outer circumferential surface thereof and being configured to be operable for containing the ice made by the ice making assembly in the cooling space;
   assembling the ice bucket to be placed at a bottom of the cooling space for accumulating the ice made by the ice making assembly placed at a top of the cooling space, and
   providing a cold air ventilation path between the case and the outer circumferential surface of the ice bucket in the cooling space for guiding the cold air to flow along the outer circumferential surface of the ice bucket,
   wherein the cold air ventilation path is formed as a furrow that guides a flow of the cold air between the contiguous ribs on the outer circumferential surface of the ice bucket, and
   wherein the ribs are formed on the outer circumferential surface to extend in a same direction as a direction in which the ice bucket slides when the ice bucket is pushed into the case and when the ice bucket is pulled out from the case.

4. The method of claim 3, wherein at least one of the ribs comprises a groove for coupling with the case, the groove being formed on a surface facing the ice making assembly.

5. A refrigerator, comprising:
   a refrigerator compartment;
   a freezer compartment coupled to the refrigerator compartment; and
   an ice maker in the refrigerator compartment and coupled to the freezer compartment, the ice maker comprising:
      a case enclosing a cooling space into which cold air is supplied;
      an ice making assembly operable for making ice using the cold air;
      an ice bucket including a plurality of ribs formed on an outer circumferential surface thereof and being configured to be operable for containing the ice made by the ice making assembly in the cooling space; and
      a cold air ventilation path provided between the case and the outer circumferential surface of the ice bucket and being configured to guide the cold air to flow along the outer circumferential surface of the ice bucket in the cooling space, wherein the cold air ventilation path is formed as a furrow that guides a flow of the cold air between the contiguous ribs on the outer circumferential surface of the ice bucket, and wherein the ribs are formed on the outer circumferential surface to extend in a same direction as a direction in which the ice bucket moves when the ice bucket is pushed into the case and when the ice bucket is pulled out from the case.

6. The refrigerator of claim 5, wherein at least one of the ribs comprises a groove for coupling with the case, the groove being formed on a surface facing the ice making assembly.

* * * * *